United States Patent
Cui et al.

(10) Patent No.: US 11,411,897 B2
(45) Date of Patent: Aug. 9, 2022

(54) COMMUNICATION METHOD AND COMMUNICATION APPARATUS FOR MESSAGE QUEUE TELEMETRY TRANSPORT

(71) Applicant: HUAWEI TECHNOLOGIES CO., LTD., Shenzhen (CN)

(72) Inventors: Gaosheng Cui, Shenzhen (CN); Baochuan Cheng, Dongguan (CN); Le Lin, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/928,204

(22) Filed: Jul. 14, 2020

(65) Prior Publication Data
US 2020/0344189 A1    Oct. 29, 2020

Related U.S. Application Data

(63) Continuation of application No. PCT/CN2019/070838, filed on Jan. 8, 2019.

(30) Foreign Application Priority Data

Jan. 16, 2018    (CN) .......................... 201810038597.7

(51) Int. Cl.
*H04L 51/04* (2022.01)
*H04L 67/12* (2022.01)
(Continued)

(52) U.S. Cl.
CPC .............. *H04L 51/04* (2013.01); *H04L 67/12* (2013.01); *H04L 67/26* (2013.01); *H04L 67/42* (2013.01)

(58) Field of Classification Search
CPC . H04L 41/0893; H04L 67/2833; H04L 51/04; H04L 67/12; H04L 67/26; H04L 67/42
See application file for complete search history.

(56) References Cited

U.S. PATENT DOCUMENTS

| 6,122,483 | A  | * | 9/2000 | Lo ...................... H04B 7/18523 |
|           |    |   |        | 455/12.1 |
| 7,720,903 | B1 | * | 5/2010 | Huckins .................. H04L 12/18 |
|           |    |   |        | 709/200 |

(Continued)

FOREIGN PATENT DOCUMENTS

| CN | 102308548 A | 1/2012 |
| CN | 102956052 A | 3/2013 |

(Continued)

OTHER PUBLICATIONS

The HiveMQ Team,"Publish and Subscribe—MQTT Essentials: Part 2",dated Jan. 19, 2015,total 13 pages.

(Continued)

*Primary Examiner* — Jeong S Park
(74) *Attorney, Agent, or Firm* — Rimon PC

(57) ABSTRACT

This application provides a communication method that includes grouping a plurality of clients to obtain at least two device groups, where each of the at least two device groups includes at least two clients. The method further includes receiving a publish request sent by a first client, where the publish request includes first data that corresponds to a first topic. The publish request is used to request a message queue telemetry transport (MQTT) server to publish the first data. After it is determined that a first device group to which the first client belongs from the at least two device groups, a publish message that includes the first data is sent to a second client in the first device group.

14 Claims, 10 Drawing Sheets

(51) Int. Cl.
  *H04L 67/55*    (2022.01)
  *H04L 67/01*    (2022.01)

(56) References Cited

U.S. PATENT DOCUMENTS

| | | | |
|---|---|---|---|
| 10,033,589 B1* | 7/2018 | Batta | H04L 41/0893 |
| 2010/0057867 A1* | 3/2010 | Yue | H04L 51/04 709/206 |
| 2012/0113817 A1* | 5/2012 | Fitzgerald | H04L 43/10 370/248 |
| 2014/0297643 A1* | 10/2014 | Bailey | G06F 16/9024 707/737 |
| 2014/0334464 A1* | 11/2014 | Qi | H04W 76/14 370/338 |
| 2015/0215186 A1* | 7/2015 | Alonso Franco | H04W 12/082 709/224 |
| 2015/0312179 A1 | 10/2015 | Ben-Ezra et al. | |
| 2015/0381776 A1 | 12/2015 | Seed et al. | |
| 2018/0167476 A1* | 6/2018 | Hoffner | H04L 67/26 |
| 2018/0183862 A1* | 6/2018 | Huh | H04L 41/0893 |

FOREIGN PATENT DOCUMENTS

| | | | |
|---|---|---|---|
| CN | 104539587 A | 4/2015 | |
| CN | 104639625 A | 5/2015 | |
| CN | 106210084 A | 12/2016 | |
| CN | 106603565 A | 4/2017 | |
| CN | 107567700 A | 1/2018 | |
| EP | 3043585 A1 | 7/2016 | |
| WO | 2016144427 A1 | 9/2016 | |
| WO | 2017143227 A1 | 8/2017 | |

OTHER PUBLICATIONS

Andrew Banks et al.,"MQTT Version 3 1.1—Committee Specification Draft 02 / Public Review Draft 02",OASIS,dated Apr. 10, 2014,total 80 pages.

RFC4251 T. Ylonen et al.,"The Secure Shell (SSH) Protocol Architecture",Network Working Group ,dated Jan. 1, 2006,total 30 pages.

RFC4252 T. Ylonen et al.,"The Secure Shell (SSH) Authentication Protocol",Network Working Group ,dated Jan. 1, 2006,total 17 pages.

RFC4253 T. Ylonen et al.,"The Secure Shell (SSH) Transport Layer Protocol",Network Working Group ,dated Jan. 1, 2006,total 32 pages.

RFC4254 T. Ylonen et al.,"The Secure Shell (SSH) Connection Protocol",Network Working Group ,dated Jan. 1, 2006,total 24 pages.

RFC1950 P. Deutsch et al.,"ZLIB Compressed Data Format Specification version 3.3",Network Working Group,dated May 1, 1996,total 10 pages.

RFC1951 P. Deutsch et al.,"DEFLATE Compressed Data Format Specification version 1.3",Network Working Group, dated May 1, 1996,total 15 pages.

* cited by examiner

COMMUNICATION METHOD AND COMMUNICATION APPARATUS FOR MESSAGE QUEUE TELEMETRY TRANSPORT

CROSS-REFERENCE TO RELATED APPLICATIONS

This application is a continuation of International Application No. PCT/CN2019/070838, filed on Jan. 8, 2019, which claims priority to Chinese Patent Application No. 201810038597.7, filed on Jan. 16, 2018. The disclosures of the aforementioned applications are hereby incorporated by reference in their entireties.

TECHNICAL FIELD

This application relates to the communications field, and more specifically, to a communication method and a communications apparatus in the communications field.

BACKGROUND

With fast development of intelligent hardware and mobile Internet technologies, Internet of Things technologies develop rapidly. However, due to constrained environmental characteristics, it is increasingly difficult for conventional Internet protocols to satisfy requirements of the Internet of Things. This is mainly reflected by high costs, a low bandwidth, and poor reliability of mobile networks. Moreover, processor and memory resources are limited. At the same time, in the Internet of Things, massive online devices generate massive volumes of data, bringing large network overheads and processing pressure to the cloud. In such a background, the Message Queue Telemetry Transport (MQTT) protocol comes into being.

In the beginning, the MQTT protocol is an instant messaging protocol developed by International Business Machines Corporation (IBM). The MQTT protocol is a messaging protocol of a publish-subscribe pattern of a client/server architecture, and a design of the MQTT protocol follows principles of lightness, openness, simplicity, normativity, and easy implementation. Implementation of the MQTT protocol is based on the Transmission Control Protocol/Internet Protocol (TCP/IP), or another ordered, reliable, and bi-directional network connection. The MQTT protocol provides easy and lightweight publish/subscribe features, and the features enable the MQTT protocol to be a good choice for many scenarios, particularly for a constrained environment such as machine-to-machine (machine-to-machine, M2M) communication or an Internet of Things (IoT) environment. Therefore, the MQTT protocol is widely used in the Internet of Things and the mobile Internet, for example, a vehicle, a smart city, Industry 4.0, a smart home, and medical care.

The MQTT protocol is a protocol designed for communication between a large quantity of remote sensors that have limited computing capacities and work in a low-bandwidth and unreliable network and control devices. The MQTT protocol has the following basic features:

Use of a publish/subscribe message pattern that provides a one-to-many message publish mechanism and decoupling of applications.

Message transmission that is agnostic to content of a payload.

Implementation based on the TCP/IP or another ordered, reliable, and bi-directional network connection.

Three types of quality of service (QoS) of message publishing:

"At most once": where message publishing completely relies on an underlying TCP/IP network, and messages are delivered based on the best efforts that an operating environment can provide. Message loss or duplication may occur. This level may be used, for example, with ambient sensor data where it does not matter if an individual piece of data is lost as it will be transmitted again soon after.

"At least once": where messages are assured to arrive, but message duplication may occur.

"Exactly once": where messages are assured to arrive exactly once. This level may be used, for example, in billing systems where message duplication or loss may lead to incorrect charges of the billing system; and Small transmission, small overheads, and protocol exchanges minimized to reduce network traffic.

A mechanism to notify clients of interested parties of an abnormal terminal by using the Last Will and Testament feature.

In an existing publish-subscribe pattern based on the MQTT protocol, when a quantity of clients is large, message forwarding performance deteriorates. In a rapid development process of the Internet of Things technologies, the quantity of clients becomes greater. Therefore, how to improve message publishing/subscription efficiency and security becomes a problem that urgently needs to be resolved.

SUMMARY

This application provides a communication method and a communications apparatus, capable of improving efficiency and security of processing message publishing/subscription by an MQTT server.

According to a first aspect, a communication method is provided. The method is applied to a message queue telemetry transport MQTT server and includes: grouping a plurality of clients, to obtain at least two device groups, where each of the at least two device groups includes at least two clients;

receiving a publish request sent by a first client, where the publish request includes first data, the first data corresponds to a first topic, and the publish request is used to request the MQTT server to publish the first data; and determining a first device group to which the first client belongs, and sending a publish message to a second client in the first device group, where the publish message includes the first data.

According to the communication method in the embodiments of this application, the MQTT server is enabled to group the clients into different device groups, and after receiving the first data sent by the first client, the MQTT server determines the first device group to which the first client belongs, and forwards the publish message to the second client in the first device group, where the publish message includes the first data, the second client may be one or more devices, and the publish message may further include an identifier of the first device group. In the communication method in the embodiments of this application, it can be determined that data sent by the first client is forwarded to the second client that belongs to the same device group, thereby ensuring security of message forwarding. Further, for the MQTT server, performing message forwarding in one device group can improve efficiency of message forwarding.

With reference to the first aspect, in an implementation of the first aspect, before the receiving a publish request sent by a first client, the method further includes:

receiving a subscribe request sent by the second client, where the subscribe request carries indication information of the first topic, and the subscribe request is used to request the MQTT server to send data corresponding to the first topic to the second client.

According to the communication method in the embodiments of this application, by receiving the subscribe request sent by the second client, where the subscribe request includes the indication information of the first topic, the MQTT server can send, based on the indication information of the first topic, the data corresponding to the first topic to the second client, where the MQTT server obtains the data corresponding to the first topic in the device group to which the second client belongs, so that security and efficiency of data sending can be ensured.

With reference to the first aspect and the foregoing implementation thereof, in another implementation of the first aspect, the grouping a plurality of clients includes:

determining a grouping condition, where the grouping condition includes a condition that identity identifiers of clients grouped into a same device group need to satisfy, and one identity identifier can uniquely indicate one client; and grouping the plurality of clients based on the identity identifiers of the plurality of clients and the grouping condition.

According to the communication method in the embodiments of this application, the MQTT server is enabled to group the clients based on the identity identifier of the clients and the grouping condition when the MQTT server has learned of the grouping condition, to be specific, after the MQTT server learns of the identity identifiers of the plurality of the clients, and one identity identifier is used to uniquely indicate one client, so that accuracy of grouping the clients can be ensured.

With reference to the first aspect and the foregoing implementations thereof, in another implementation of the first aspect, before the grouping the plurality of clients based on the identity identifiers of the plurality of clients and the grouping condition, the method further includes:

receiving identification information of each client in the plurality of clients sent by the client, where the identification information of the client is used to indicate the identity identifier of the client.

According to the communication method in the embodiments of this application, the MQTT server is enabled to receive the identification information respectively corresponding to the clients before grouping, where each piece of identification information is used to indicate the identity identifier of the corresponding client, so that it can be ensured that the MQTT server has clearly learned of the identity of the client during grouping.

With reference to the first aspect and the foregoing implementations thereof, in another implementation of the first aspect, the determining a first device group to which the first client belongs includes:

determining the first device group based on an identity identifier of the first client and the grouping condition.

According to the communication method in the embodiments of this application, the MQTT server is enabled to determine, based on the identity identifier of the first client and the grouping condition, the first device group to which the first client belongs, so that accuracy of determining the first device group to which the first client belongs is increased because the identity identifier of the first client can determine the identity of the first client.

With reference to the first aspect and the foregoing implementations thereof, in another implementation of the first aspect, the identity identifier includes user information of a user of the client or an Internet Protocol address of the client.

According to the communication method in the embodiments of this application, the identity of the first client is uniquely identified by using the user information of the user of the client or the Internet Protocol address of the client, the first client can be accurately denoted.

With reference to the first aspect and the foregoing implementations thereof, in another implementation of the first aspect, before the MQTT server groups the plurality of clients, the method further includes:

determining that each client in the plurality of clients allows being grouped into a device group.

According to the communication method in the embodiments of this application, determining that each client in the plurality of clients allows being grouped into a device group before the MQTT server groups the plurality of clients enables the communication method of this application to be compatible with a conventional communication method that does not include grouping. That is, a client that does not allow being grouped into a device group can continue using a conventional MQTT protocol to perform message forwarding.

With reference to the first aspect and the foregoing implementations thereof, in another implementation of the first aspect, the determining that each client in the plurality of clients allows being grouped into a device group includes:

receiving a grouping flag sent by each client in the plurality of client, where each grouping flag is used to indicate whether a corresponding client allows being grouped into a device group.

According to the communication method in the embodiments of this application, the MQTT server is enabled to receive the grouping flag, determine, based on the grouping flag, whether the client supports grouping, if the client supports grouping, perform grouping based on the foregoing grouping method, and if the client does not support grouping, perform message processing based on the conventional MQTT protocol.

With reference to the first aspect and the foregoing implementation thereof, in another implementation of the first aspect, the grouping flag is carried in a connection request message, where the connection request message is used to request to establish a connection with the MQTT server.

According to the communication method in the embodiments of this application, overheads of messages can be reduced by carrying the grouping flag in the connection request message.

With reference to the first aspect and the foregoing implementations thereof, in another implementation of the first aspect, the grouping flag occupies at least one bit in the first byte of a fixed header of the connection request message.

According to the communication method in the embodiments of this application, compatibility with the conventional MQTT protocol can be achieved by enabling the grouping flag to occupy at least one bit in the first byte of the fixed header of the connection request message.

According to a second aspect, a communication method is provided. The communication method is applied to an MQTT client and includes:

sending a connection request message to an MQTT server, where the connection request message is used to request to establish a connection with the MQTT server, and the connection request message includes a grouping flag; and receiving a connection acknowledgment message sent by the MQTT server, where the connection acknowledgment message is used to acknowledge that the MQTT server has established a connection with the MQTT client, and the connection acknowledgment message includes a device group identifier assigned by the MQTT server for the MQTT client. According to the communication method in the embodiments of this application, by making the grouping flag carried when the MQTT client sends the connection request to the MQTT server, the MQTT server can group the client based on the grouping flag and a preset grouping condition, and add identification information of the device group of the client to the connection acknowledgment message, to notify the client of the device group to which the client belongs. Therefore, in subsequent message processing, message forwarding can be performed with a device group as a unit, thereby improving efficiency and security of message forwarding.

With reference to the second aspect, in an implementation of the second aspect, the grouping flag occupies at least one bit in the first byte of a fixed header of the connection request message. According to the communication method in the embodiments of this application, compatibility with a conventional MQTT protocol can be achieved by adding the grouping flag to the fixed header of the connection request message.

With reference to the second aspect and the foregoing implementation thereof, in another implementation of the second aspect, the method further includes:

receiving a publish message sent by the MQTT server, where the publish message includes the device group identifier.

According to the communication method in the embodiments of this application, by making the publish message received by the MQTT client include the device group identifier, the client can learn of a device group to which a client publishing a message belongs, thereby improving security of message publishing.

According to a third aspect, a communications apparatus is provided. The apparatus may be configured to perform an operation of the MQTT server according to the first aspect and any possible implementations of the first aspect. Specifically, the communications apparatus includes a corresponding means (means) configured to perform a step or function described in the foregoing first aspect, and may be the MQTT server according to the first aspect. The step or function may be implemented by software, or may be implemented by hardware, or may be implemented by a combination of hardware and software.

According to a fourth aspect, a communications apparatus is provided. The apparatus may be configured to perform an operation of a second communications device according to the second aspect and any possible implementations of the second aspect. Specifically, the apparatus may include a corresponding means (means) configured to perform a step or function described in the foregoing first aspect. The step or function may be implemented by software, or may be implemented by hardware, or may be implemented by a combination of hardware and software.

According to a fifth aspect, a communications device is provided, where the communications device includes a processor and a memory. The memory is configured to store a computer program, and the processor is configured to invoke and run the computer program, to enable the communications device to perform the communication method according to any possible implementation of the first or second aspect.

Optionally, the processor may be one or more processors, and the memory may be one or more memories.

Optionally, the memory and the processor may be integrated together, or may be disposed separately.

Optionally, the communications device further includes a transmitter (transmitting device) and a receiver (receiving device).

In a possible design, a communications device is provided, including a transceiver, a processor, and a memory. The processor is configured to control the transceiver to send and receive signals; the memory is configured to store a computer program; and the processor is configured to invoke the computer program from the memory and run the computer program, to enable the communications device to perform the method according to the first aspect or any possible implementation of the first aspect.

In another possible design, a communications device is provided, including a transceiver, a processor, and a memory. The processor is configured to control the transceiver to send and receive signals; the memory is configured to store a computer program; and the processor is configured to invoke the computer program from the memory and run the computer program, to enable the communications device to perform the method according to the second aspect or any possible implementation of the second aspect.

According to a sixth aspect, a system is provided. The system includes the foregoing communications apparatus.

According to a seventh aspect, a computer program product is provided. The computer program product includes a computer program (also referred to as code or an instruction), and when the computer program is run, a computer is enabled to perform the method according to any possible implementation of the first aspect or the second aspect.

According to an eighth aspect, a computer-readable medium is provided. The computer-readable medium stores a computer program (also referred to as code or an instruction), and when the computer program is run, a computer is enabled to perform the method according to any possible implementation of the first aspect or the second aspect.

According to a ninth aspect, a chip system is provided, including a memory and a processor. The memory is configured to store a computer program, and the processor is configured to invoke and run the computer program, to enable a communications device in which the chip system is installed to perform the method according to any possible implementation of the first aspect or the second aspect.

In the communication method, the communications apparatus, and the communications device in the embodiments of the present invention, the clients connected to the MQTT server are grouped first, and data sent by the first client is then forwarded in the first device group to which the first client belongs, or a subscribe request of the second client is received, data related to a subscription topic is obtained in the first device group to which the second client belongs, and the data is sent to the second client, so that efficiency and security of data forwarding can be improved.

DESCRIPTION OF EMBODIMENTS

Figure 1:
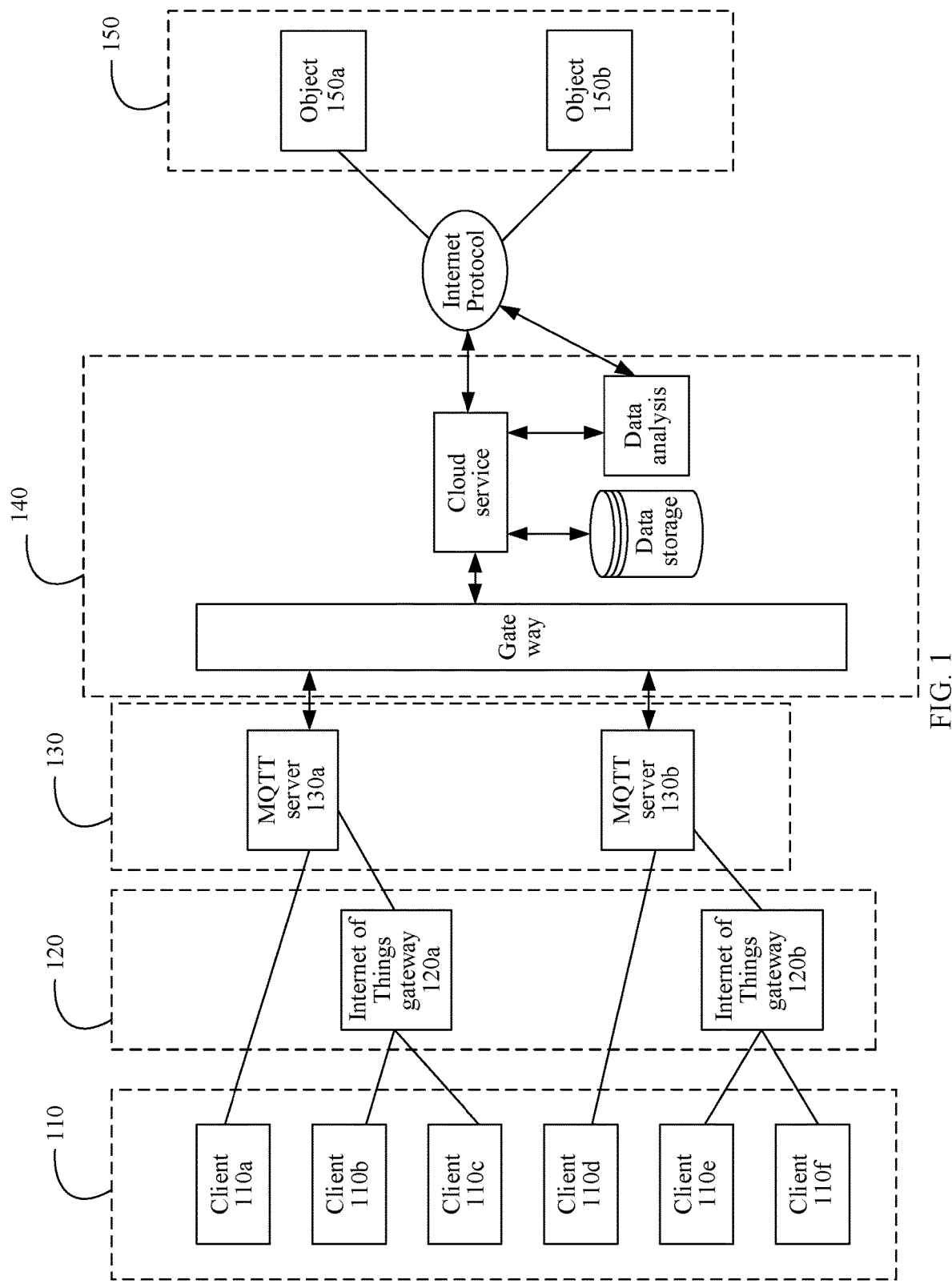
FIG. 1 is a diagram of an application scenario according to this application.

The following first briefly describes concepts in the MQTT protocol.

In the MQTT protocol, a subscriber is a message consumer, and a publisher is a message generator. A "relationship" is established between the subscriber and the publisher by an access control list (ACL), a topic name (TN) or a topic for short, and a topic filter (TF). For the MQTT protocol, both the message generator and the message consumer are referred to as clients.

MQTT message subscription and publishing are implemented based on the topic name and the topic filter. Therefore, the topic is very important as a bridge between two parties of the subscription. Concepts of the topic name and the topic filter are described as follows.

Topic name: a topic of message publishing, which is a "clear" topic and cannot include a wildcard.

Topic filter: a topic of message subscription, which can include a particular wildcard and allows a client to subscribe to a plurality of topics once.

There is a concept of a topic level in the MQTT. The topic is a structured and multi-level structure, each level is referred to as a topic level (topic level), and topic levels are connected by a topic level separator ('/'), for example:

myhome/groundfloor/livingroom/temperature

The client may subscribe to corresponding topic content based on a publish message of the topic level or based on the topic filter.

The topic filter completes message subscription by matching the topic name. When the topic filter includes a wildcard, a leveled structure of the topic can implement leveled subscription of the topic, that is, to subscribe all topic messages on a specific topic level. The MQTT provides two wildcard mechanisms as follows.

Multi-level wildcard: A number sign ('#') is a wildcard that is used to match any level in the topic. The multi-level wildcard represents its parent level and any quantity of sub-levels. The multi-level wildcard is located at its own level or follows the topic level separator. In either case, the wildcard is the last character of the topic filter.

An example of multi-level wildcard matching is as follows:

myhome/groundfloor/#

Each topic example and matching results thereof are as follows:

myhome/groundfloor/livingroom/temperature
myhome/groundfloor/kitchen/temperature
myhome/groundfloor/kitchen/brightness Single-level wildcard (single-level wildcard): A plus sign ('+') is a wildcard that can only be used for matching of a single topic level. The single-level wildcard can be used in any level of the topic filter, including the first level and the last level. However, the single-level wildcard occupies an entire level of the topic filter. The single-level wildcard can be used in a plurality of levels of the topic filter, and can be used together with the multi-level wildcard.

An example of single-level wildcard matching is as follows:

myhome/groundfloor/+/temperature

Matching structures of a topic example are as follows:

myhome/groundfloor/livingroom/temperature
myhome/groundfloor/kitchen/temperature To conveniently maintain the relationship between the subscriber and the publisher, the MQTT provides two subscription patterns:

Precise subscription: Only a message generated by a specific client (terminal) is subscribed to. For example, an individual subscribes to a sensor message at home by using a mobile phone App. In such a scenario, the topic filter is equivalent to the topic name, that is, the foregoing topic and the topic filter are consistent.

Fuzzy subscription: Messages generated by all terminals (controlling permissions by using an ACL) are subscribed to. For example, an Internet of Things application (an electricity supplier) subscribes to device messages of all users. In the fuzzy subscription, a topic filter of a subscriber includes one or two of the foregoing wildcards.

The following describes technical solutions of this application with reference to accompanying drawings.

FIG. 1 is a diagram of an application scenario according to this application. The scenario includes a client 110, an Internet of Things gateway 120, an MQTT server 130, a cloud service 140, and an object 150. The following describes the five parts in detail.

The client 110 (as shown in FIG. 1, including clients 110*a* to 110*f*) is a client using the MQTT protocol, including a program or a device using the MQTT protocol, where the program using the MQTT protocol may be code run on any device. The client 110 is connected to the MQTT server 130 through a network, and is responsible for collecting data and publishing the data to MQTT server 130. Based on different application scenarios, some clients can be connected to the MQTT server directly by using the MQTT protocol, and some clients need to be connected to the MQTT server through a gateway.

In this application, no limitation is imposed on which devices the client 110 specifically is. Using a household appliance as an example, the client 110 may be a lighting system, a temperature control system, a water flow control system, or the like, or may be a mobile phone, a mobile computer, a personal computer, or the like used by a user.

Functions of the client 110 include:

publishing an application message to another related client, for example, uploading, by a household appliance, related information;

performing subscription to request for a related application message, for example, checking, by a user, related home information by using a mobile phone;

unsubscribing to remove a request for receiving an application message; and being disconnected from the MQTT server.

The Internet of Things gateway 120 (as shown in FIG. 1, including an Internet of Things gateway 120a and an Internet of Things gateway 120b) serves as an access gateway of the sensor. In the MQTT protocol, a gateway may be an MQTT server in a bridge mode, or when the client can be directly connected to the MQTT server 130, the Internet of Things gateway may be a client.

The MQTT server 130 (as shown in FIG. 1, including a server 130a and a server 130b) is responsible for message subscription and publishing. In this application, the MQTT server may be a program or a hardware server, or a combination of a program and a hardware server. The MQTT server 130 performs communication based on the TCP/IP protocol, and is bound to a port 1833 by default, or may be bound to another specified port. This is not limited in this application. Moreover, a plurality of MQTT servers can form a cluster, and clients connected to each MQTT server member in the cluster can synchronously subscribe to a message. That is, a client can subscribe to, through a server directly connected to the client, a message of a client connected to another server in the cluster. In addition, the MQTT server can access an MQTT server at a higher level as a client, that is, the foregoing bridge mode. In this mode, the MQTT server can publish a message to a specified topic based on configuration, or subscribe to a message with the MQTT server at the higher level and publish the message to its own client. Therefore, the MQTT server can configure a plurality of communications interfaces as required, and the MQTT server may be internally divided into a plurality of modules.

Functions of the MQTT server 130 include:
accepting a network connection from a client;
accepting an application message published by the client;
processing subscribe and unsubscribe requests from the client; and
forwarding the application message to a client satisfying a condition for subscription.

The cloud service 140 is configured to process a message generated after the MQTT server 130 performs computing processing, such as aggregation and statistics collection, on a message generated by the client 110, for example, send the processed message to a third party, where the third party includes another application (application, APP), or a user, or another page. This is not limited in this application.

The object 150 (as shown in FIG. 1, including an object 150a and an object 150b) is configured to receive data sent by the cloud service 140 and may be a network device or an application side. In this application, no limitation is imposed on the object 150 which the cloud service 140 processes and to which the cloud service 140 sends the processed data.

In an existing system architecture based on the MQTT protocol shown in FIG. 1, a main function of the MQTT server is processing a message generated by a client, presenting the message to a user or a third-party application after performing computing processing, such as aggregation and statistics collection, on the message, and performing a next step of the processing procedure by using a processing result as input. Such a fan-in (fan in) message processing manner forms an aggregated message processing mode.

Figure 2:
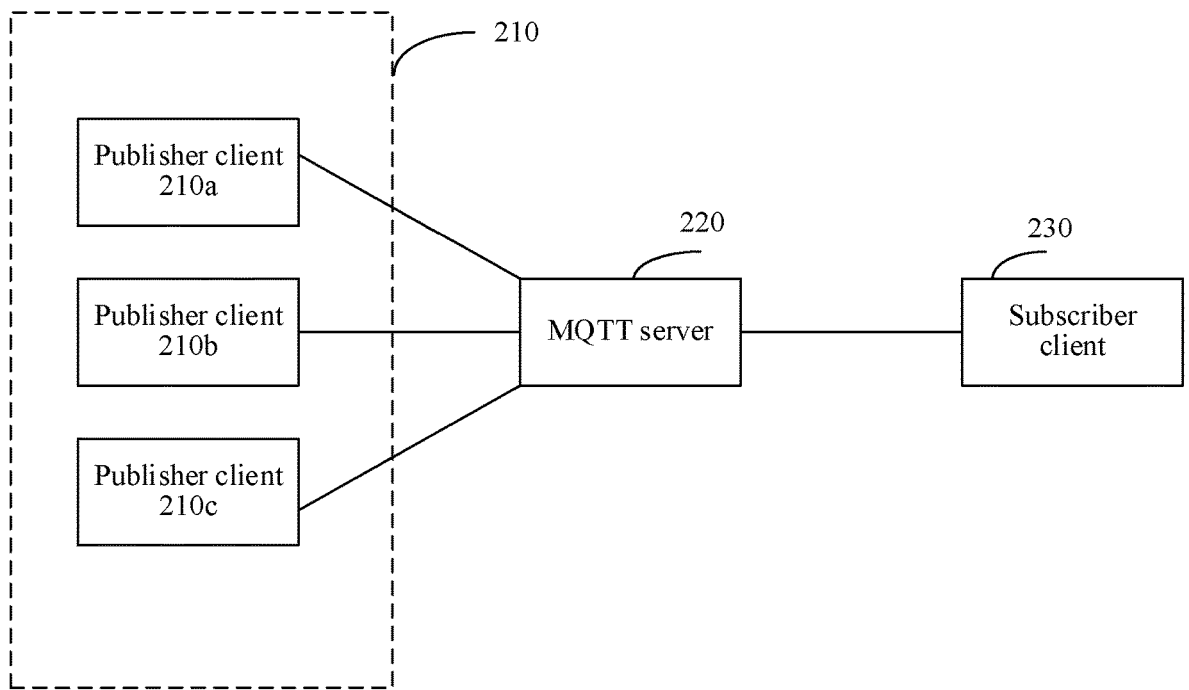
FIG. 2 is a schematic diagram of an aggregated message processing mode.

FIG. 2 is a schematic diagram of an aggregated message processing mode. The schematic diagram includes a publisher client 210, an MQTT server 220, and a subscriber client 230. The following describes the three parts in detail.

The publisher client 210 (as shown in FIG. 2, including publisher clients 210a to 210c) is configured to publish a message to the MQTT server 220.

The MQTT server 220 is configured to process the message published by the publisher client 210, for example, perform computing processing such as aggregation and statistics collection.

The subscriber client 230 is configured to subscribe to a message with an MQTT server, where a topic filter in a subscription message sent by the subscriber client may include a wildcard (a single-level wildcard or a multi-level wildcard), used to subscribe to a specific type of message published by the publisher client 210.

Based on a subscription manner in this mode, all client messages are pushed indiscriminately through topic matching. Although such a subscribe-publish mechanism implements a one-to-many message subscribe-publish mechanism, due to absence of a client grouping mechanism, all devices can indiscriminately subscribe to and publish a message, and relatively, security of message communication is reduced. Moreover, a topic tree needs to be maintained for pushing a message through a topic, and for different devices, topics of messages with different meanings need to be strictly discriminated. In such case, when massive devices exist in the Internet of Things, a scale of the topic tree becomes relatively large, and message forwarding performance deteriorates.

With development of Internet of Things technologies, an increasing quantity of devices exist in the Internet of Things. Performance requirements of message processing, such as security of message communication and efficiency of message processing, cannot be satisfied if the message processing manner shown in FIG. 2 is continuously used. Therefore, this application provides a communication method capable of satisfying a performance requirement of message processing when massive devices exist in the Internet of Things.

Figure 3:
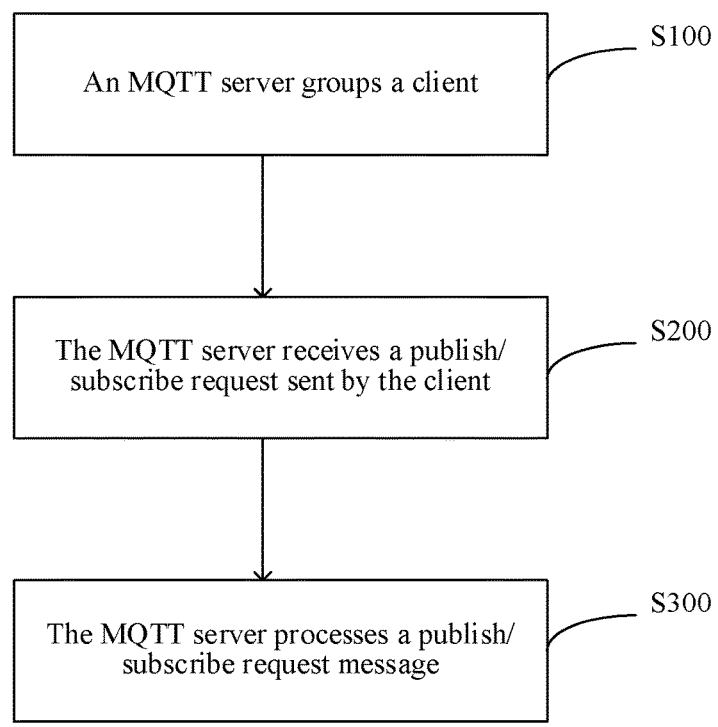
FIG. 3 is a schematic block diagram of a communication method according to an embodiment of this application.

FIG. 3 is a schematic block diagram of a communication method according to an embodiment of this application, including three steps: S100 to S300. The following separately describes the three steps in detail.

S100: An MQTT server groups clients.

The MQTT server groups a plurality of clients, to obtain at least two device groups, where each of the at least two device groups includes at least two clients.

Optionally, when a client sends a connection request to the MQTT server, a grouping flag capable of indicating whether the client supports a grouping mechanism is sent, and the MQTT server determines, based on the grouping flag, whether the client supports grouping. In this application, the grouping flag may be carried in a reserved bit of the connection request, or may be separately sent to the MQTT server. This is not limited in this application. In addition, the grouping flag of each client may alternatively be learned of by the MQTT server through network planning. In this case, the client does not need to send the grouping flag.

When a client sends a connection request to the MQTT server, an identity identifier capable of representing an identity of the client is sent. Optionally, the MQTT server in this application can receive identification information of each client in the plurality of clients sent by the client, where the identification information of the client is used to indicate the identity identifier of the client. If the client supports grouping, the MQTT server groups clients into different device groups based on the identity identifier of each client, the clients in different device groups satisfy different grouping conditions, and the grouping condition is specified by a preset grouping rule, where the grouping rule is known to the MQTT server. For example, the grouping rule may be delivered by an administrator or may be set in network planning. This is not limited in this application.

Optionally, the identification information may be a user name (user name) of a user of the client, a user identity (ID) of a user of the client, or an Internet Protocol (IP) address of the client. All the pieces of identification information can be used to uniquely determine the identity of the client. This is not limited in this application, and the foregoing identity identifier may also be other information capable of representing the identity of the client.

Optionally, the MQTT server groups connected clients based on the preset grouping rule, to obtain at least two device groups, where each of the at least two device groups includes at least two clients.

Optionally, the MQTT server generates a subscription tree by using an ID of each device group as a root node of a subscription tree in each device group, and maintain a subscription relationship in a corresponding device group based on the subscription tree in each device group, thereby improving maintenance efficiency.

Optionally, the MQTT server sends the ID of each device group to each client that belongs to the device group. For example, a connection acknowledgment message carries the ID, so that each client may specify a device group to which the client belongs when sending a message. The MQTT server may alternatively skip sending the ID of the device group, and determine the device group to which the client belongs based on the connection with the client when receiving a message from the client. This is not limited in this application.

S200: The MQTT server receives a publish/subscribe request message sent by the client.

Optionally, the MQTT server receives a publish request sent by the client, where the publish request is used to request the MQTT server to publish data in the publish request. Alternatively, the MQTT server receives a subscribe request sent by the client, where the subscribe request carries indication information of a subscription topic, and the subscribe request is used to request the MQTT server to send data corresponding to the subscription topic to the client.

S300: The MQTT server processes the publish/subscribe request message.

Optionally, after receiving the publish request sent by the client, the MQTT server determines, based on the grouping in S100, a device group to which the client sending the publish request belongs, and sends a publish message only to a subscriber client that subscribes to the data and is located at the device group to which the client sending the publish request belongs, where the publish message includes data in the publish request. Optionally, the publish message may further include an identifier of the foregoing device group. Alternatively, after receiving the subscribe request sent by the client, the MQTT server determines, based on the grouping in S100, a device group to which the client sending the subscribe request belongs, matches, in the device group to which the client sending the subscribe request belongs, data corresponding to a topic carried in the subscribe request, and sends the data corresponding to the topic to the subscriber client. Optionally, the MQTT server may send identification information of the device group to the subscriber client.

For ease of description of the following specific embodiments in this application, first, packet types and content of a packet included in the embodiments in this application are described systematically.

First, a connection packet (client request to connect to server, CONNECT) related to an identity identifier of a client and a grouping flag in this application is described. The CONNECT is a connection request message sent to a server side by a client, including three parts: a fixed header, a variable header, and a valid payload. The following describes a CONNECT packet in the conventional MQTT protocol.

1. Fixed Header.

Constitution of the fixed header of the CONNECT packet is shown in Table 1:

TABLE 1

| Fixed header of CONNECT | | | | | | | | |
|---|---|---|---|---|---|---|---|---|
| Bit | 7 | 6 | 5 | 4 | 3 | 2 | 1 | 0 |
| First byte | Message type | | | | Reserved | | | |
| | 0 | 0 | 0 | 1 | 0 | 0 | 0 | 0 |
| Second byte | Remaining length | | | | | | | |

In a first byte, four high-order bits are 0001, and four low-order bits are reserved bits. In the conventional MQTT protocol, four lower-order bits of a first byte a fixed header of a CONNECT packet are 0 by default, that is, any one of reserved bits is available.

The four high-order bits being 0001 indicates that a message type is CONNECT. In the conventional MQTT protocol, the first byte of the fixed header is used to represent a message type and a reserved field. The message type is represented by four high-order bits, which can represent 16 message types, as shown in Table 2:

TABLE 2

| Message type | | |
|---|---|---|
| Message type | List of decimal values of four high-order bits | Message description |
| Reserved | 0 | Reserved |
| Connection request | 1 | A client requests to connect to a server |
| Connection acknowledgment | 2 | A connection response sent to a client by a server |
| Publish | 3 | A publish message sent to a server by a client |
| Publish acknowledgment | 4 | A publish acknowledgment sent to a client by a server |
| Publish received | 5 | Publish received and assured delivery 1 |
| Publish release | 6 | Publish release and assured delivery 2 |
| Publish complete | 7 | Publish complete and assured delivery 3 |
| Subscribe | 8 | A subscribe request sent to a server by a client |
| Subscribe response | 9 | A subscribe response sent to a client by a server |
| Unsubscribe | 10 | A client unsubscribes |
| Unsubscribe response | 11 | An unsubscribe response from a server |
| Backup request | 12 | A backup request from a client |
| Backup response | 13 | A backup response from a server |
| Disconnect | 14 | A server disconnects a connection |
| Reserved | 15 | Reserved |

2. Variable Header.

The variable header of CONNECT includes four parts: a protocol name (protocol name), a protocol level (protocol level), a connect flag, and Keep Alive. MQTT protocols of different versions have different protocol names and protocol levels. If finding that the protocol name is incorrect, an MQTT server disconnects a connection. If a protocol level does not correspond, a code is returned to notify the client.

The connect flag includes a user name flag, a password flag, Will Retain, Clean Session, and Reserved. Their positions are as shown in Table 3:

TABLE 3

| Connect flags of CONNECT | | | | | | | |
|---|---|---|---|---|---|---|---|
| 7 | 6 | 5 | 4 | 3 | 2 | 1 | 0 |
| User Name Flag | Password Flag | Will retain | Will Quality | Will Flag | Clean Session | Reserved | |

In this application, when the identity identifier is the foregoing identity (ID) of a user of the client, the identity identifier is related to the user name flag in the connect flag part of the variable header in Table 3.

User name flag:

The user name flag is used to identify whether a related part exists in the valid payload. For example, that a user name is marked as 1 means that the valid payload includes information of the user name.

3. Valid Payload

The valid payload of the CONNECT message includes one or more UTF-8 encoded character strings based on a setting status of each flag bit in the variable header. This application describes the identity of a user of the client and a user name character string that are in the valid payload.

A User ID of a User of a Client:

This is the first UTF encoded character string. A length of the client ID (Client ID) of a user of the client ranges from 1 to 23 characters, and the server can uniquely specify one client based on the user ID of a user of the client. Therefore, in this application, the MQTT server may determine the identity of the client based on the user ID and group the client based on the identity of the client. The user ID of each client connected to a particular MQTT server is unique.

User Name:

If the User Name Flag in Table 3 is set, the user name is a character string in the valid payload. The user name field is used for verification and denotes a name of a connected user. In this application, the MQTT server may determine the identity of the client based on the user name of a user of the client and group the client based on the identity of the client.

Then, sending a connection acknowledgment packet (CONNACK) related to a device group ID to a client is described in this application. The CONNACK is a connection response message in response to the connection request sent by the MQTT server to the client, including two parts: a fixed header and a variable header. The following describes a CONNACK packet in the conventional MQTT protocol.

1. Fixed Header.

Constitution of the fixed header of the CONNACK packet is shown in Table 4:

TABLE 4

| Fixed header of CONNACK | | | | | | | | |
|---|---|---|---|---|---|---|---|---|
| Bit | 7 | 6 | 5 | 4 | 3 | 2 | 1 | 0 |
| First byte | Message type | | | | Reserved | | | |
| | 0 | 0 | 1 | 0 | 0 | 0 | 0 | 0 |
| Second byte | Remaining length | | | | | | | |

In a first byte, four high-order bits are 0010, and four low-order bits are reserved bits. In the conventional MQTT protocol, values of the four lower-order bits of the first byte in the fixed header of the CONNACK packet and values of the four lower-order bits of the first byte in the fixed header of the CONNECT packet are same. In this application, if the client supports the grouping mechanism, and a grouping flag is carried in the four low-order bits of the first byte in the fixed header of the CONNECT packet, the four low-order bits of the first byte in the fixed header of the CONNACK packet need to be changed synchronously.

The four high-order bits of the first byte being 0010 denotes that a message type is CONNACK.

2. Variable Header.

Constitution of the variable header of the CONNACK packet is shown in Table 5:

TABLE 5

| Variable header of CONNACK | | | | | | | | |
|---|---|---|---|---|---|---|---|---|
| Description | 7 | 6 | 5 | 4 | 3 | 2 | 1 | 0 |
| Connection Acknowledgment Identifier | Reserved bit | | | | | | | Current session |
| First byte | 0 | 0 | 0 | 0 | 0 | 0 | 0 | X |
| | Connection return code | | | | | | | |
| Second byte | X | X | X | X | X | X | X | X |

This application, using the grouping flag carried in the fixed header of the CONNECT as an example, how to determine whether the client supports the grouping mechanism is described. It can be learned of from Table 1 that, the four low-order bits in the fixed header of the CONNECT are reserved bits. In the conventional MQTT protocol, the four low-order bits are 0 by default, that is, any one of the spare bits can be used. For example:

Optionally, in this application, the zeroth bit may be used as the grouping flag. For example, that a value of the zeroth bit is 1 denotes that the client supports the device group mechanism, or that the value of the zeroth bit is 1 denotes that a client does not support the device group mechanism. A client that does not support the device group mechanism supports an original message subscribe-publish mechanism of the MQTT, which may be exact subscription or fuzzy subscription.

Optionally, in this application, the first bit may be used as the grouping flag. That a value of the first bit described above is 1 denotes that the client supports the device group mechanism.

Optionally, in this application, the second bit may be used as the grouping flag. That a value of the second bit described above is 1 denotes that the client supports the device group mechanism.

Optionally, in this application, the third bit may be used as the grouping flag. That a value of the third bit described above is 1 denotes that the client supports the device group mechanism.

Optionally, in this application, the zeroth bit and the first bit may be used as the grouping flag. That the values of the zeroth bit and the first bit described above are both 1 denotes that the client supports the device group mechanism.

Optionally, in this application, the zeroth bit and the second bit may be used as the grouping flag. That the values of the zeroth bit and the second bit described above are both 1 denotes that the client supports the device group mechanism.

There are other forms of using values of the four low-order bits to denote that the client supports the device group mechanism, and they are not enumerated herein. Provided that a value of at least one of the four low-order bits is different from a default value in the conventional MQTT protocol, that the value can denote the client supports the device group mechanism.

It should be understood that, using at least one bit in the reserved bits in the fixed header of the CONNECT in the conventional MQTT protocol as a bit for the grouping flag is merely an embodiment of this application. In this application, using the reserved bit is compatible with the conventional MQTT protocol and reduces information overheads. However, other information indicating the grouping flag also falls within the protection scope of this application.

Optionally, the server may send the device group identifier of the device group to the server. For example, this application, using the device group identifier that is sent by the server to the client and that is carried in the variable header of the CONNACK packet as an example, how to inform the client of the device group to which the client belongs is described. The server sends the CONNACK packet in response to the CONNECT packet received from the client. The first packet sent to the client by the server is the CONNACK. If the client does not receive the CONNACK packet from the server within an appropriate time, the client needs to disconnect the network connection. The appropriate time depends on an application type and communications infrastructure. It can be seen from Table 5 that, a second byte in the variable header of the CONNACK is a connection return code. In this application, if the client supports the grouping mechanism, the values of the four low-order reserved bits in the first byte of the fixed header of the CONNACK is synchronized with the values of the four low-order bits in the first byte of the fixed header of the CONNECT. The fixed header of the CONNACK may carry the device group identifier of the client sending the CONNECT in the connection return code. In this application, the reserved bits of the variable header of the CONNACK are not modified.

It should be understood that, using the variable header of the CONNACK in the conventional MQTT protocol to add the device group identifier of a device group to which the client sending the CONNECT belongs in the connection return code is merely an embodiment of this application. In this application, using the connection return code is compatible with the conventional MQTT protocol and reduces information overheads. However, other information carrying the device group identifier of the device group to which the client belongs also falls within the protection scope of this application.

Figure 4:
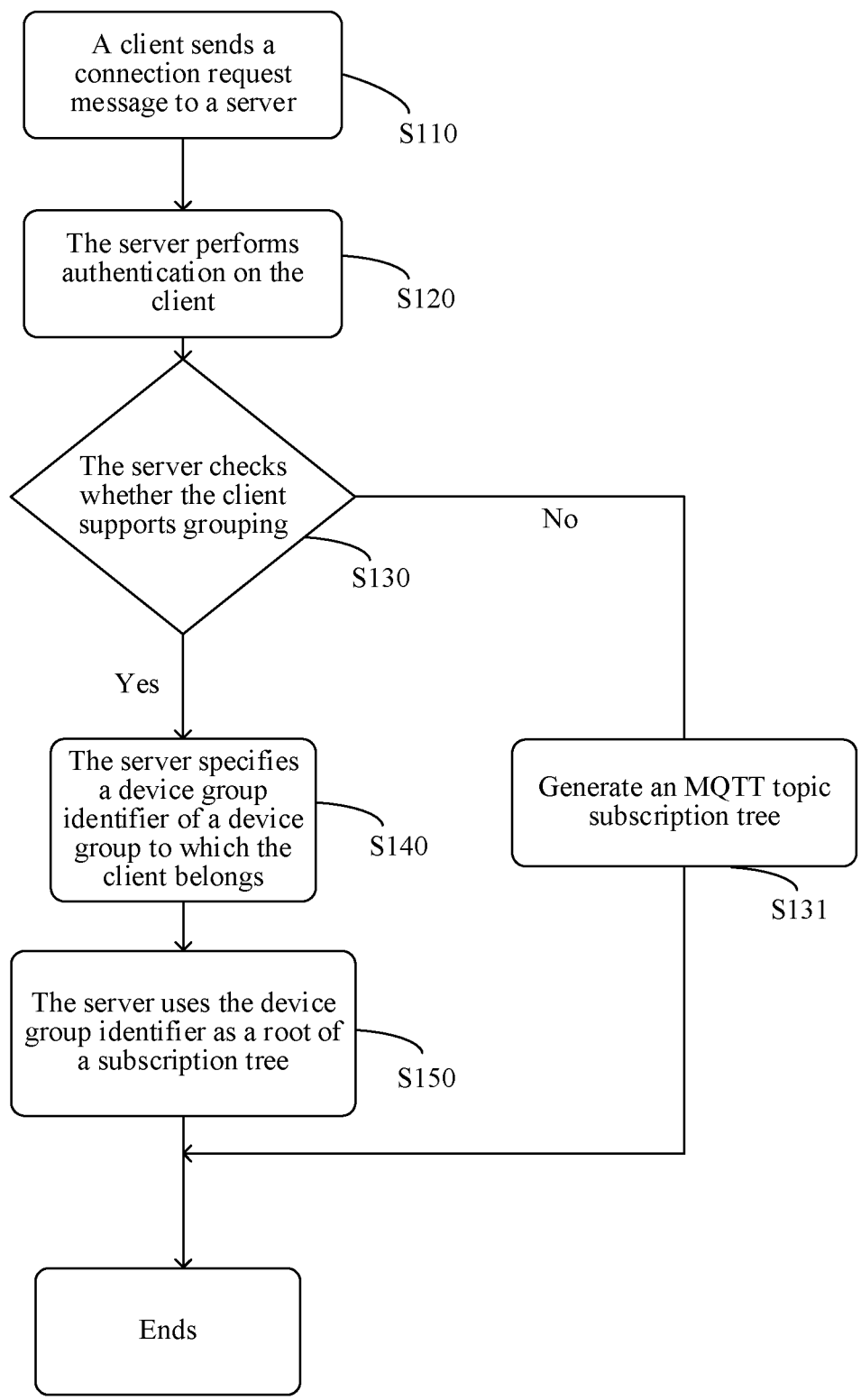
FIG. 4 is a schematic flowchart of grouping a device group according to this application.

FIG. 4 is a schematic flowchart of grouping a device group according to this application. In an implementation case of this application, a user name of a client is used as an identity identifier, and grouping of the client is performed based on the user name. When the client establishes a connection with a server, the server needs to ensure validity of the client by using a client authentication mechanism. A grouping rule is delivered based on the user name, thereby to some extent ensuring that only a valid client can participate in the grouping of device groups. A specific grouping process is shown in FIG. 4, including six steps: S110 to S150 and S131. The following describes the six steps in detail.

S110: The client sends a connection request message to the server.

The client sends the CONNECT message to a server side device. A grouping flag is carried in a fixed header of the CONNECT packet, where the grouping flag is used to determine whether the client supports a device group mechanism, a valid payload of the CONNECT packet carries the identity identifier, and the identity identifier is used to uniquely indicate the identity of the client. For example, the identity identifier may be the user name. The valid payload of the CONNECT packet is related to some flags in the variable header of the CONNECT packet.

Optionally, in this embodiment, a format of the fixed header of the CONNECT packet shown in Table 6 is used as an example:

TABLE 6

| Fixed header of CONNECT | | | | | | | | |
|---|---|---|---|---|---|---|---|---|
| Bit | 7 | 6 | 5 | 4 | 3 | 2 | 1 | 0 |
| First byte | Message type | | | | Reserved | | | |
|  | 0 | 0 | 0 | 1 | 0 | 0 | 0 | 1 |
| Second byte | Remaining length | | | | | | | |

It can be learned of from the possibilities of the grouping flag described above that, when at least one bit in four low-order bits is not consistent with default values of a fixed header of a CONNECT packet in the conventional MQTT protocol, it is considered that the client sending the CONNECT supports the device group mechanism. That is, the server can group it.

Optionally, in this embodiment takes a position 1 for a user name flag in the variable header of the sent CONNECT packet as an example. That is, a user name part in the valid payload of the CONNECT packet is a character string in the valid payload, where the user name field is used to indicate a name of a user of the connected client.

Optionally, in this embodiment, the user name is used as the identity identifier, so that security of MQTT message delivery can be further enhanced in addition to separating logical device groups of clients in this application because an access control list may be used to perform authentication based on the user name of the client to validity of the client.

S120: The server performs authentication on the client.

When the client establishes a connection with a server, the validity of the client needs to be ensured by using a client authentication mechanism. In this embodiment, a device group grouping rule is delivered based on the user name, thereby to some extent ensuring that only a valid client can participate in the grouping of device groups.

S130: The server checks whether the client supports grouping.

After the server receives the CONNECT connection request message sent by the client, the server in this embodiment can obtain, based on values of the four low-order bits in the fixed header of the CONNECT packet, whether the client sending the CONNECT connection request message supports the grouping mechanism.

Using the foregoing format of the fixed header of the CONNECT packet as an example, after receiving the CONNECT connection request message, the server can learn that a value of the zeroth bit in the four low-order bits of the first byte in the fixed header is 1 and is not consistent with the default value of the zeroth bit in the four low-order bits of the first byte in the fixed header of a CONNECT packet in the conventional MQTT protocol. In this way, the server may learn that the client sending the CONNECT connection request message supports the grouping mechanism, and group the client based on a preset grouping rule. In this embodiment, the preset grouping rule may be determined by a server administrator based on the user name. For example, it is specified that clients whose user names are A1, A2, and A3 belong to one device group, a device group identifier of the device group to which the clients belong is an identity identification code (ID) and is ID1, clients whose user names are B1, B2, and B3 belong to one device group, an ID of the device group to which the clients belong is ID2, and so on.

Optionally, in this embodiment, if the format of the fixed header of the foregoing CONNECT packet is consistent with a format of a fixed header of a CONNECT packet in the conventional MQTT protocol, it can be learned that the client sending the CONNECT does not support the grouping mechanism. If not supporting the grouping mechanism, the client belongs to a public group by default, and messages published by it can be subscribed to by all subscriber clients.

S131: Generate an MQTT topic subscription tree.

Figure 5:
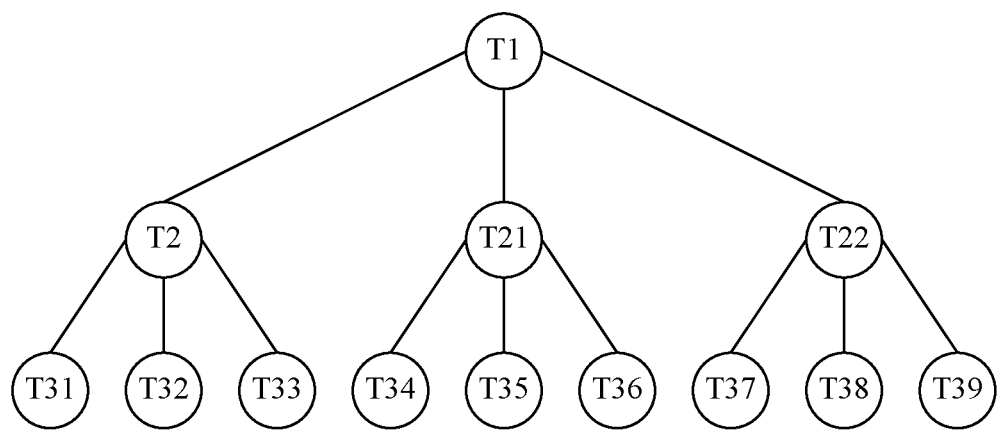
FIG. 5 is a schematic diagram of an MQTT topic subscription tree.

Optionally, in this embodiment, if the client does not support the grouping mechanism, that is, if the server cannot group the client, a current publish/subscribe mechanism is used for subsequent message publishing and message subscription. As shown in FIG. 5, T1, T2, and the like are topic names. FIG. 5 is an existing schematic diagram of generating an MQTT topic subscription tree. All subscription relationships are maintained by using one subscription tree. In the subscription tree, topics are organized in a tree structure based on "/". In the subscription tree shown in FIG. 5, each node of the subscription tree is a topic level, and each topic corresponding to a node is a topic formed from a root node to a current node.

S140: The server specifies a device group identifier of a device group to which the client belongs.

Optionally, in this embodiment, if the client supports the grouping mechanism, the server groups the client based on the preset grouping rule, and specifies the device group identifier of the device group to which the client belongs. In this embodiment, optionally, for example, if the user name of the client is A1, the server specifies, based on the foregoing grouping rule, the device group identifier of the device group to which the client belongs to be ID1.

S150: The server uses the device group identifier as a root of the subscription tree.

Figure 6:
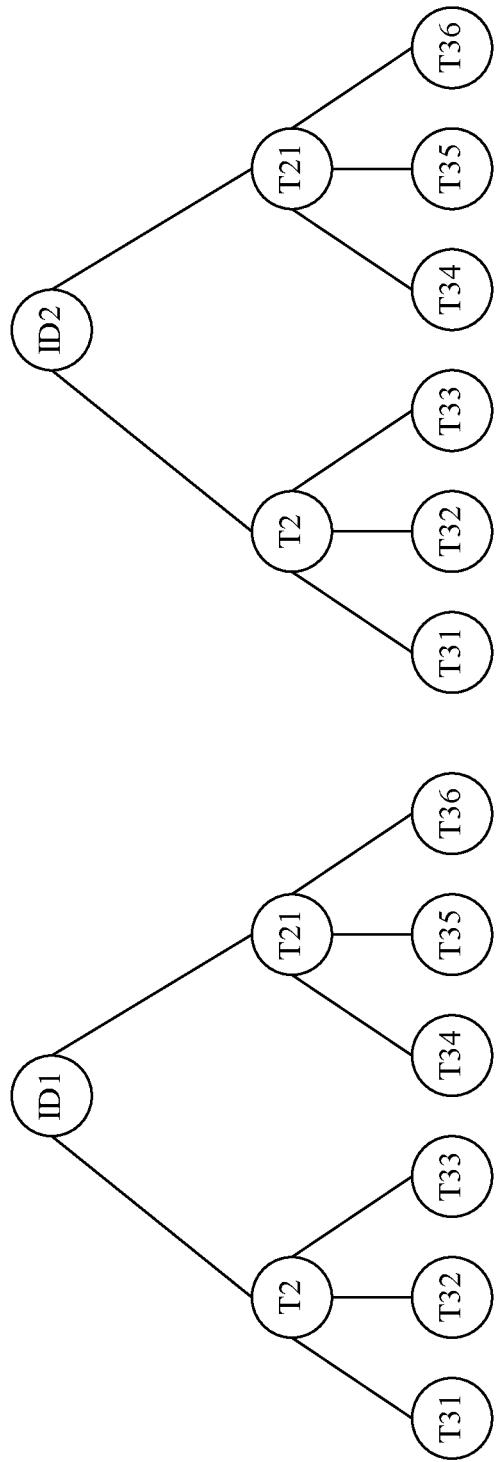
FIG. 6 is a schematic diagram of a subscription tree using a device group identifier as a root.

Optionally, in this embodiment, the device group ID is used as the root of the subscription tree to maintain subscription relationships in the device group. As shown in FIG. 6, T2, T21, and the like are topic names. FIG. 6 is a schematic diagram of a subscription tree using a device group ID as a root. In different device groups, messages with a same topic may be published. Because different groups are independent of each other, flexibility of message publishing is improved. Performing message publishing or subscription in each group narrows a retrieval scope and improves message pushing efficiency.

In this application, for the client supporting the grouping mechanism, after grouping is performed based on the user name, and the device group ID of each device group is used as the root of the subscription tree, the device group grouping process ends; and for the client not supporting the grouping mechanism, the topic name is used as the root node of the subscription tree, and the grouping process ends.

After the connection is successfully established, clients with a same device group ID form an isolated Internet of Things. The server performs message subscription and message pushing for the clients in the same Internet of Things, and allows the clients to specify a device group ID when sending a message, to perform message pushing between device groups.

It should be understood that, in this application, this embodiment uses the zeroth bit in the four low-order bits of the fixed header of the CONNECT packet as the grouping flag, and uses the user name of the client as the identity identifier. Parameter examples are listed just for describing the grouping process, and other information that can be the grouping flag and the identity identifier, such as other information that is sent by the client to the server and that carries the grouping flag and the identity identifier, also falls within the protection scope of this application.

Figure 7:
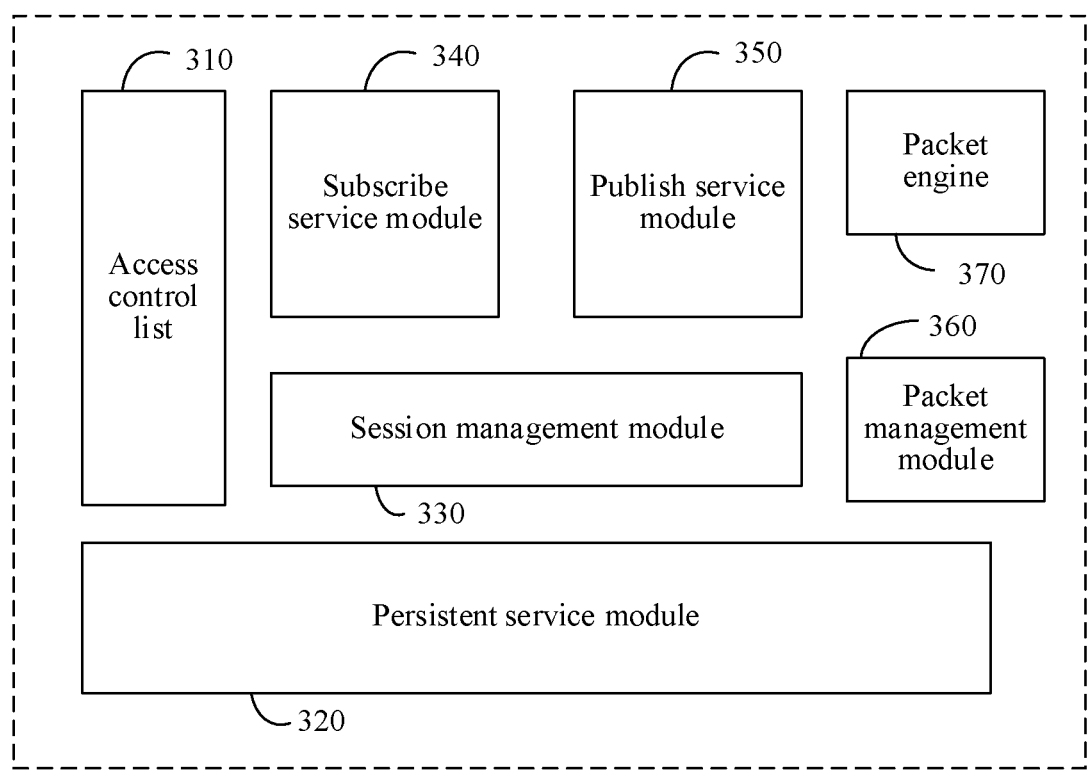
FIG. 7 is a schematic diagram of an internal structure of an MQTT server according to this application.

FIG. 7 is a schematic diagram of an internal structure of an MQTT server according to this application, including an access control list 310, a persistent service module 320, a session management module 330, a subscribe service module 340, a publish service module 350, a packet management module 360, and a packet engine 370. A difference from an existing MQTT server lies in that, in this application, the packet management module 360 and the packet engine 370 are added to the MQTT server and are configured to implement the function of grouping a client.

The following describes the seven parts in detail.

The access control list (ACL) 310 is responsible for client access verification and operation authentication. A client provides a user name and a password or a certificate during connection. An ACL module performs verification on the client, and after the verification succeeds, stores a session of the client into the session management module (session manager).

During an operation of the client, the ACL performs authentication on the operation, where the operation mainly includes publish and subscribe operations. The ACL needs to check whether the client has a permission of accessing (read/write) a topic (topic) for publishing and subscription, and if the client does not have the permission, reject the operation. Otherwise, a corresponding service module performs the operation.

The persistent service module (persistent service) 320 is responsible for persistence of information about a message, a session, a client, and the like.

The session management module (session manager) 330 is responsible for managing a session of a client. When the client is reconnected after a disconnection, provided that the session is within a validity period, the session manager may recover subscription of the client based on the session of the client, and re-deliver a new message during the disconnection.

The subscribe service module (subscribe service) 340 is a service means configured to process a message subscribe request, and process, when the client submits a subscribe request, the request based on a subscription processing logic of the MQTT: traverse topic levels in the subscription filter, hang the request on a corresponding node of the subscription tree, and at last, hang the subscriber client in a client list of a node corresponding to the last topic level.

The publish service module (publish service) 350 is a service means configured to process message publishing. When a client publishes a message, after authentication of the ACL succeeds, the publish service module forwards the publish message. The means has three functions.

When processing is performed based on QoS, a retain identifier, and a subscription status that are of the publish message, the following cases are included.

If the publish message is a retain message, the persistent service needs to be invoked for message persistence.

If the message is a message whose QoS>0, in addition to performing an operation of QoS=0, the message needs to be stored for a period of time, and subscription recovery and distribution need to be performed again when the subscriber client is reconnected after a temporary disconnection.

The publish service module further includes a topic matching module (topic matcher) configured to process traversal of the subscription tree, match a publish topic with a subscribe filter, and distribute a message to a successfully matched subscriber client.

The publish service module further includes a tag matching module (tags matcher) configured to process a tag of a publisher/subscriber client, where matching of the tag includes:

after the topic matcher finishes the matching, obtaining a successfully matched topic filter and a client list corresponding thereto; and traversing the client list, and if the client supports tag-aware during subscription, invoking a tag engine to send the message when the matching succeeds; otherwise, that is, a default subscription manner does not support tag-aware, skipping processing, directly distributing the message to the client.

The packet management module (packet manager) 360, as a supplement of the session manager, provides a management service for a feature of a client packet. In this application, the packet management module is configured to maintain grouping information, such as information about which device groups currently respectively correspond to which grouping rules. In FIG. 4, it is specified that clients whose user names are A1, A2, and A3 belong to one device group, a device group identifier of the device group to which the clients belong is an identity identification code (ID) and is ID1, clients whose user names are B1, B2, and B3 belong to one device group, an ID of the device group to which the clients belong is ID2, and grouping information that A1 belongs to ID1 may be managed by the packet management module.

The packet engine 370 is a rule engine configured to perform packet grouping, group a connected client based on a packet grouping rule, match the group, and retrieve a grouping subscription tree. In this application, the packet engine is an executor of a grouping action. The grouping action is performed based on a specified rule. For example, the packet management module obtains information that the grouping rule specifies that A1 belongs to D1, and the packet engine can group A1 into ID1 based on the grouping information.

It should be understood that FIG. 7 is a schematic structural diagram of a specific internal structure of the server, which may be a plurality of functional modules included in one program, and for each module, there are same or different processes or threads responsible for implementation in the program. Therefore, in this application, processing a publish/subscribe request message by the server may be performing one or more programs. This is not limited in this application. In this application, the server may merely include the publish/subscribe service module, the packet management module, and the packet engine, may only complete grouping-based publishing/subscription, may skip performing authentication on the client, or may not include the persistent service module and the session management module. This application does not describe the ACL 310, the persistent service 320, and the session manager 330 in detail. The following mainly describes: in this application, in the grouping mechanism, how the service publish/subscribe module, the packet management module, and the packet engine that are of the server complete the grouping of the client, and perform message processing in the device group.

It should be understood that, FIG. 7 is a schematic diagram of a specific internal structure of the server, including simple function execution modules inside the server. A message exchange between clients may be completed by a communications module in the prior art. For example, the communications module may be used to receive or send a message. This is not mentioned herein when the specific internal structure of the server is described.

Figure 8:
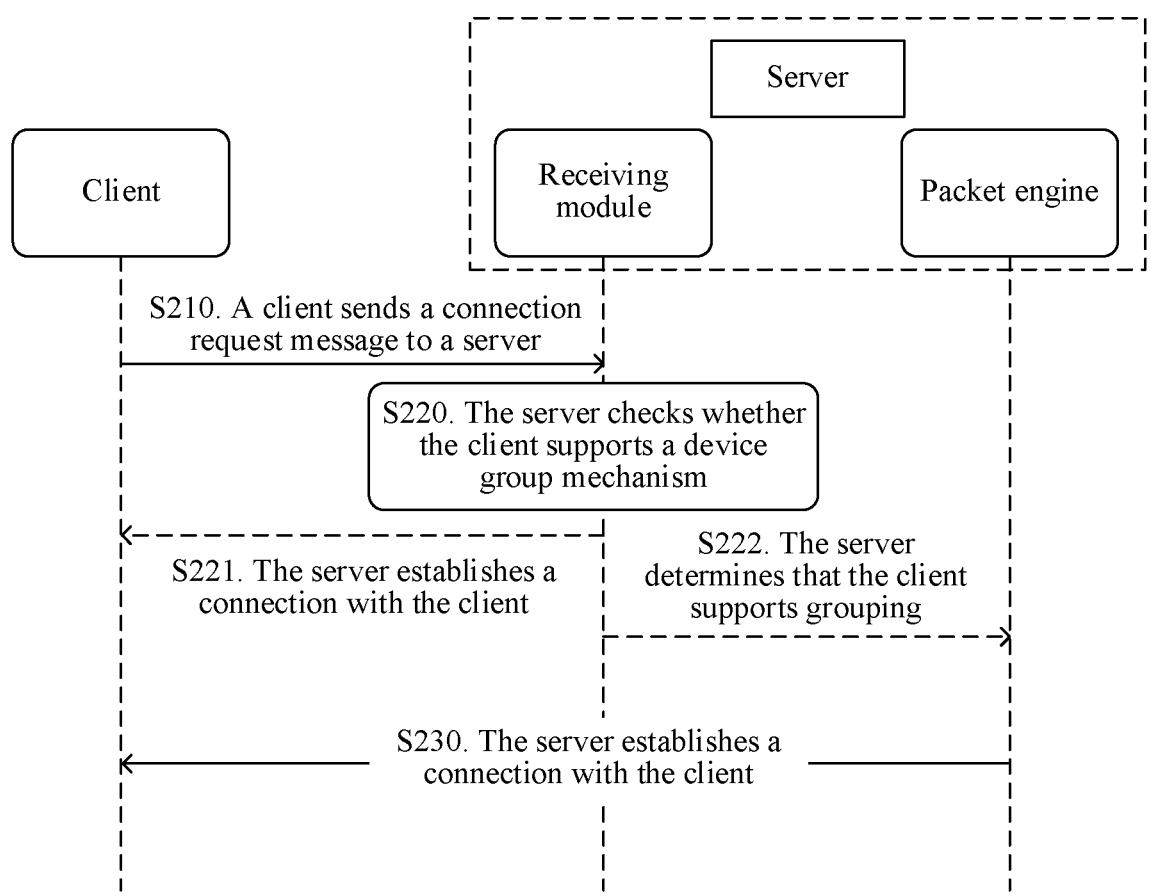
FIG. 8 is a schematic interaction diagram of a grouping process according to this application.

FIG. 8 is a schematic interaction diagram of a grouping process according to this application, including five steps: S210 to S230 and S221 to S222. The following describes the five steps in detail.

S210: A client sends a connection request message to a server.

The client sends the connection request message CONNECT to the server, where the CONNECT carries a grouping flag, and the server can determine whether the client supports grouping based on the grouping flag.

S220: The server checks whether the client supports a device group mechanism.

An MQTT server packet management module of the server checks whether the client supports grouping based on the grouping flag in the CONNECT.

S221: The server establishes a connection with the client.

If the client does not support the grouping mechanism, the server establishes a connection with the client based on the CONNECT, and performs subsequent message publishing and message subscription.

S222: The server determines that the client supports grouping.

If the client supports the grouping mechanism, a packet engine unit of the server groups the client based on a grouping rule.

S230: The server establishes a connection with the client.

After being grouped, the client supporting the grouping mechanism establishes a connection with the server.

In this application, when establishing a connection with the client, the MQTT server determines whether the client supports the grouping mechanism based on the grouping flag carried in the connection request message, and groups the client if the client supports the grouping mechanism, to improve efficiency and security of message processing in subsequent message publishing/subscription based on a device group.

Figure 9:
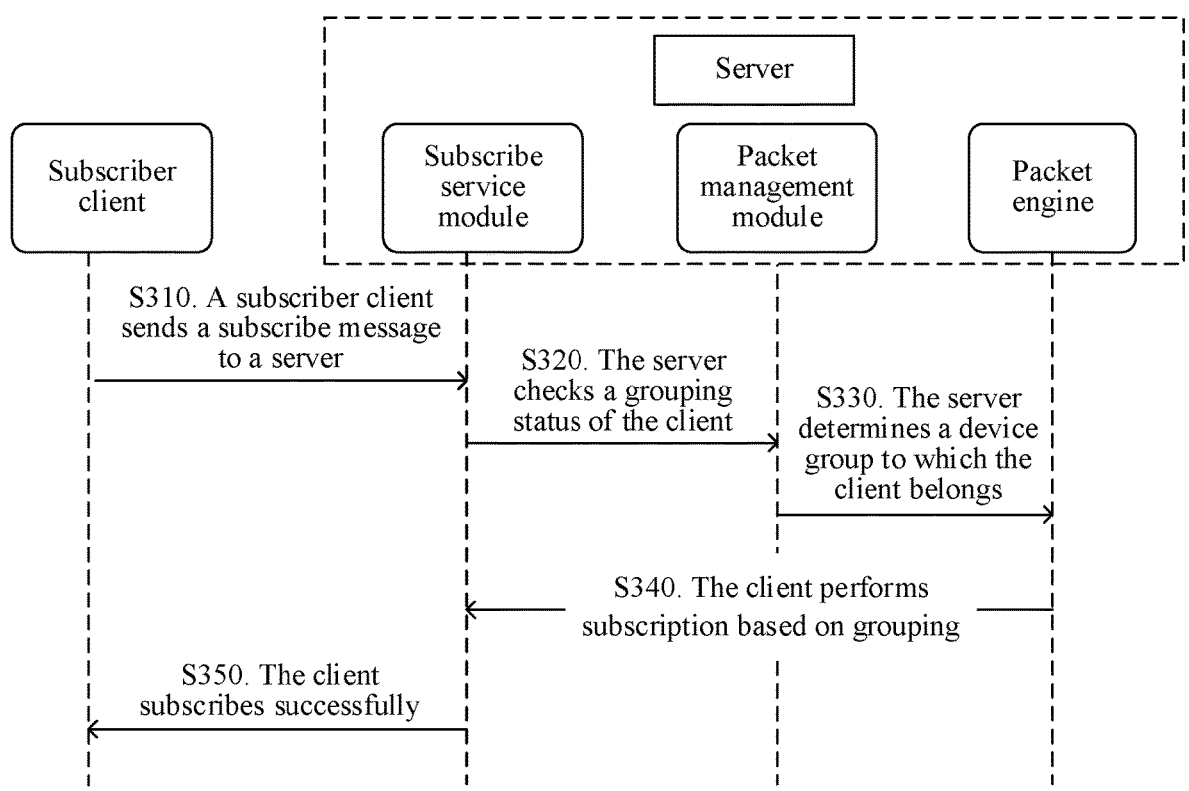
FIG. 9 is a schematic interaction diagram of a grouping-based subscription process according to this application.

FIG. 9 is a schematic interaction diagram of a grouping-based subscription process according to this application. In this embodiment, after a client successfully sends a CONNECT message and receives a CONNACK message from the server that authorizes the client to establish a connection, the client sends a subscribe message to subscribe to a topic list (including at least one topic) of interest.

FIG. 9 includes five steps: S310 to S350. The following describes the five steps in detail.

S310: A subscriber client sends a subscribe message to a server.

The message subscriber client sends the subscribe message to a subscribe service module, where the subscribe message includes a packet identifier and a subscription list, and the packet identifier is a unique identifier between the client and the server and is used to identify a specific message in an identification message flow. The subscribe message may include subscription to any quantity of messages of a specific client, and each subscription includes a topic and a QoS level. The topic of the subscribe message may further include a wildcard, enabling the subscriber client to subscribe to a particular topic mode. If a client is repeatedly subscribed to, a proxy server uses a highest QoS level of the topic to transfer a message.

The packet identifier and the subscription list of the subscribe message are not limited in this application, and the subscribe message may be of any type.

S320: The server checks a grouping status of the client.

A packet manager of the server performs a management service or a packet attribute of the client and checks a grouping status of the client.

In this application, when the client initiates a connection request, to be specific, sends a CONNECT, to the server, an identity identifier and a grouping flag are carried. The server determines whether the client supports grouping based on the grouping flag, and specifies the client into a device group based on the identity identifier.

In this application, when the client subscribes to a message, the server re-checks whether the client sending the subscribe message supports grouping based on the message when the connection is established, and determines a device group to which the client belongs.

S330: The server determines a device group to which the client belongs.

A packet engine of the server performs packet grouping of the client, and the grouping is based on a grouping rule.

In this application, when the client sends the subscribe message, for example, the client supports grouping, the packet engine matches grouping information for the client and groups the client into a corresponding device group.

S340: The client performs subscription based on grouping.

In this application, after being grouped into a device group, the client subscribes to a message in the device group, and the server generates a subscription tree by using a device group ID as a root directory.

S350: The client subscribes successfully.

A subscribe service module of the server traverses topic levels in a subscription filter of the client based on the subscription tree that uses the device group ID as the root directory, hangs the client on a corresponding node, and at last, hangs the subscriber client in a client list of a node corresponding to the last topic level. The subscription process ends. The server sends a subscription response (SUBACK) message to the subscriber client.

In this embodiment, a subscription process for a client that supports grouping is provided. If a client that does not support grouping subscribes to a message, the subscribe service module of the server directly responds by skipping grouping by the packet manager and the packet engine.

Figure 10:
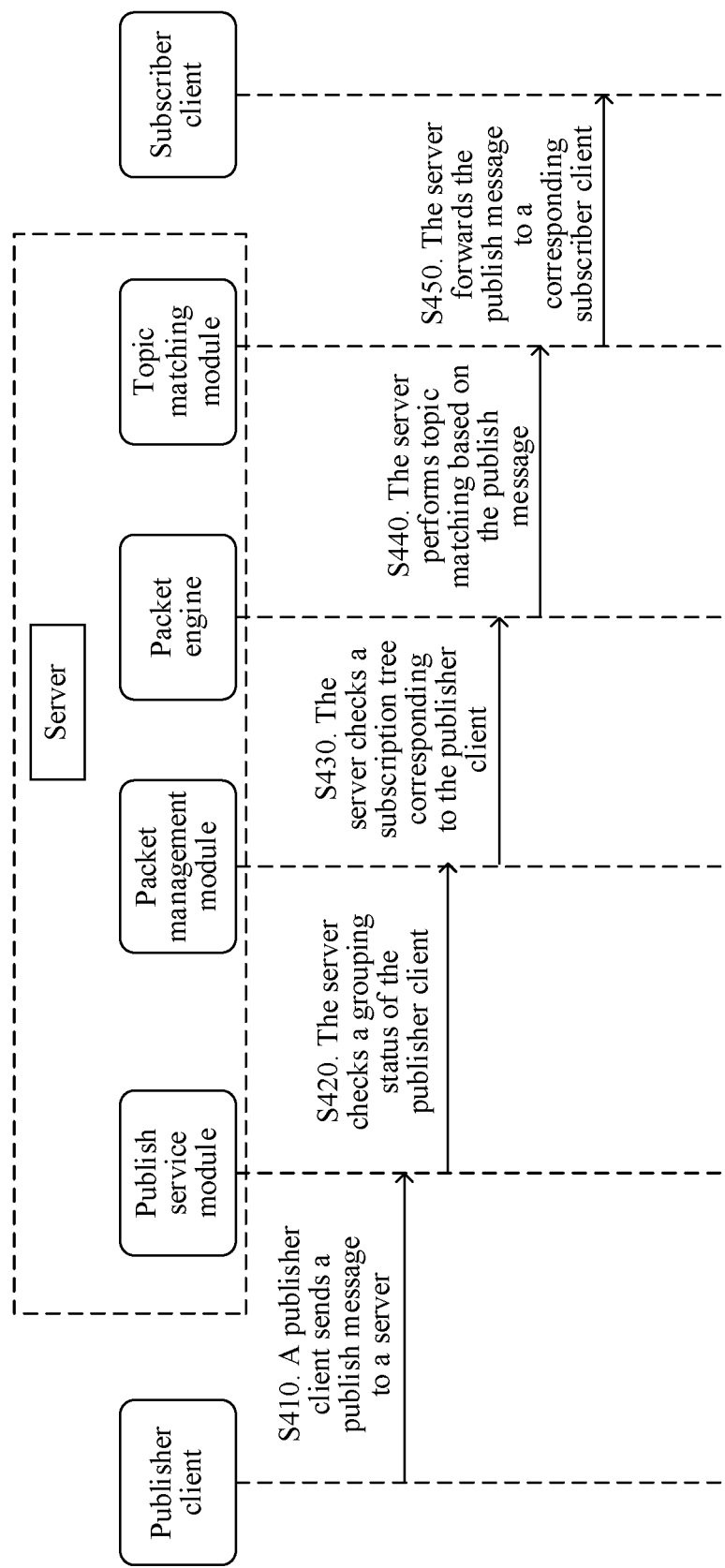
FIG. 10 is a schematic interaction diagram of a grouping-based publishing process according to this application.

FIG. 10 is a schematic interaction diagram of grouping-based publishing process according to this application, including five steps: S410 to S450. The following describes the five steps in detail.

In this application, when the MQTT performs message publishing, the publishing needs to be performed based on a grouping result. In a conventional MQTT protocol, when a first bit and a second bit that are in a first byte of a publish packet are both 1, the first bit and the second bit are reserved bits. In this application, the reserved bits may be used as bits for device group identifier. If the reserved bits are true, that is, the first bit and the second bit are both 1, then in the message publishing, a device group ID may be specified in a variable header of the PUBLISH packet. A format of a fixed header of the PUBLISH packet is shown in Table 7:

TABLE 7

| | | | | Fixed header of PUBLISH | | | | |
|---|---|---|---|---|---|---|---|---|
| Bit | 7 | 6 | 5 | 4 | 3 | 2 | 1 | 0 |
| First byte | Message type | | | | DUP | QoS level | | Reserved |
| | 0 | 0 | 1 | 1 | X | X | X | X |
| Second byte | | | | Remaining length | | | | |

S410: A publisher client sends a publish message to a server.

The message publisher client sends the publish message (publish message) to the server, where the publish message carries topic information.

S420: The server checks a grouping status of the publisher client.

A packet manager of the server checks a packet attribute of the client and determines a grouping status of the publisher client.

In this application, when the client initiates a connection request, to be specific, sends a CONNECT, to the server, an identity identifier and a grouping flag are carried. The client determines whether the client supports grouping based on the grouping flag, and specifies the client into a device group based on the identity identifier.

In this application, when the client publishes a message, the server re-checks whether the client sending the publish message supports grouping based on the message when the connection is established, and determines a device group to which the client belongs. Optionally, when a device group ID is specified in the variable header of the PUBLISH packet, the server may obtain information of the device group to which the publisher client belongs based on the device group ID specified by the publisher client.

S430: The server checks a subscription tree corresponding to the publisher client.

A packet engine of the server performs packet grouping of the client, performs grouping based on a grouping rule, and checks the subscription tree of the device group corresponding to the publisher client.

In this application, when the client sends the publish message, for example, if the client supports grouping, then the packet engine matches grouping information for the client, groups the client into a corresponding device group, and checks the subscription tree of the corresponding device group.

S440: The server performs topic matching based on the publish message.

A topic matcher in the server performs topic matching in the device group to which the publisher client belongs based on the publish message sent by the publisher client.

In this application, after grouping the client, the server pushes the published message in the device group, determines whether there is a client in the device group subscribes to and responds to a topic message, performs topic matching, and pushes the message.

S450: The server forwards the publish message to a corresponding subscriber client.

The server connects the publisher client and the subscriber client, receives a matched topic message that is from the publisher client and that is subscribed to by the subscriber client, and forwards the topic message to the subscriber client that is in the same device group and that subscribes to a corresponding publish topic.

In this embodiment, a message publish process for a client that supports grouping is provided. If a client that cannot be grouped publishes a message, a message publish process is same with a conventional publish process, and grouping by the packet manager and the packet engine is skipped.

It should be understood that, in this embodiment, the subscriber client and the publisher client are merely examples for description. In the MQTT protocol, a client may be a subscriber client and/or a publisher client. This is not limited in this application.

Figure 11:
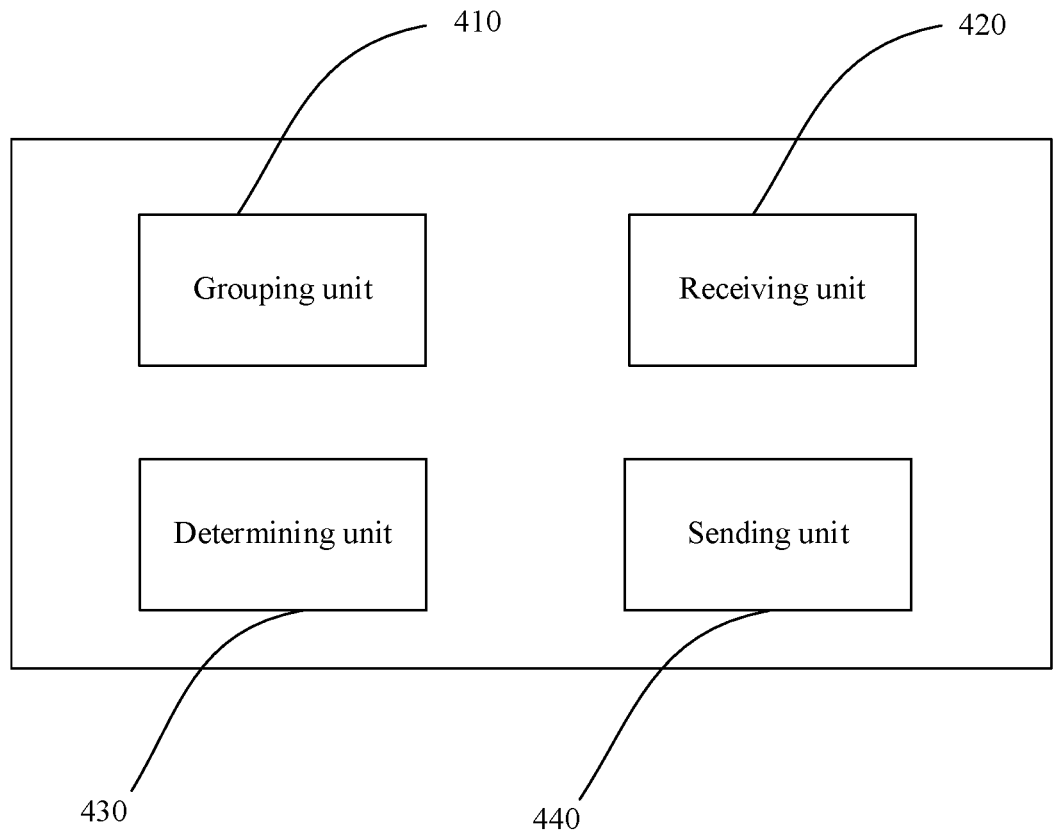
FIG. 11 is a schematic structural diagram of a communications apparatus according to an embodiment of this application.

FIG. 11 is a schematic structural diagram of a communications apparatus of this application, including a grouping unit 410, a receiving unit 420, a determining unit 430, and a sending unit 440. The following describes the four parts in detail.

The grouping unit 410 of the server, optionally, may be configured to group a plurality of clients, to obtain at least two device groups, where each of the at least two device groups includes at least two clients. The grouping unit is further configured to: determine a grouping condition, where the grouping condition includes a condition that identity identifiers of clients grouped into a same device group need to satisfy, and one identity identifier can uniquely indicate one client; and group the plurality of clients based on the identity identifiers of the plurality of clients and the grouping condition.

For example, the grouping unit may be implemented by the packet management module and the packet engine in FIG. 7, where the packet management module is configured to manage grouping information and grouping rules corresponding to different device groups, and determine a device group to which the client belongs, and the packet engine is configured to perform grouping. Therefore, it should be understood that, in this application, the grouping unit may be cooperatively implemented by the packet management and the packet engine in FIG. 7, and the packet management and the packet engine may be two functions of one module or a plurality of modules. This is not limited in this application.

The receiving unit 420 of the server, optionally, may be configured to receive a publish request sent by a first client, where the publish request includes first data, the first data corresponds to a first topic, and the publish request is used to request the server to publish the first data.

The receiving unit 420 may further receive a subscribe request sent by the second client, where the subscribe request carries indication information of the first topic, and the subscribe request is used to request the MQTT server to send data corresponding to the first topic to the second client.

The receiving unit 420 may further receive a grouping flag sent by each client in the plurality of client, where each grouping flag is used to indicate whether a corresponding client allows being grouped into a device group.

For example, the receiving unit 420 in this application may be implemented by a module of the MQTT server that communicates with the client.

The determining unit 430 of the server, optionally, may be configured to determine a first device group to which the first client belongs in the at least two device groups, and send a publish message only to at least one second client in the first device group, where the publish message includes the foregoing first data, and the publish message may further includes a device group identifier of the first device group. Alternatively, the determining unit may be configured to determine a first device group to which the second client belongs in the at least two device groups, and determine first data, where the first data is from at least one client in the first device group, and the first data corresponds to the first topic. For example, the determining unit 430 may be implemented by the packet management module and the packet engine in FIG. 7, where the packet management module is configured to manage grouping information and grouping rules corresponding to different device groups, and determine a device group to which the client belongs, and the packet engine is configured to determine grouping based on a grouping rule managed by the packet management module.

The sending unit 440 of the server, optionally, may be configured to send the publish message to the second client. For example, the determining unit 440 may be implemented by a module of the MQTT server that communicated with the client.

Optionally, in this application, the four parts 410 to 440 may be four functions of one functional module of the server. This is not limited in this application.

Figure 12:
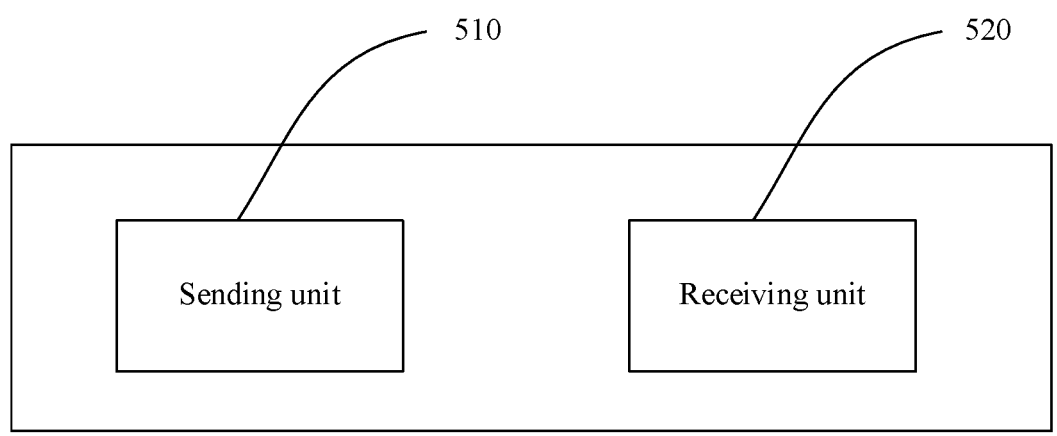
FIG. 12 is a schematic structural diagram of another communications apparatus according to an embodiment of this application.

FIG. 12 is a schematic structural diagram of another communications apparatus according to this application, including a sending unit 510 and a receiving unit 520. The following describes the two parts in detail.

The sending unit 510 of the client in this application, optionally, may be configured to send a connection request message, a publish message, or a subscribe message, to a server.

The receiving unit 520 of the client in this application, optionally, may be configured to receive a connection acknowledgment message or a publish message sent by a server.

Optionally, in this application, the two parts 510 and 520 may be two functions of one functional module of the client. This is not limited in this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, wherein the method is applied to a message queue telemetry transport (MQTT) server, and the method comprises:
grouping a plurality of clients to obtain at least two device groups, wherein each of the at least two device groups comprises at least two clients, including
determining a grouping condition, wherein the grouping condition is specified by a preset grouping rule and comprises a condition that identity identifiers of clients grouped into a same device group need to satisfy, and one identity identifier can uniquely indicate one client, and
grouping the plurality of clients based on the identity identifiers of the plurality of clients and the grouping condition;

receiving a publish request sent by a first client, wherein the publish request comprises first data, the first data corresponds to a first topic, and the publish request is used to request the MQTT server to publish the first data; and selecting, using an identity identifier of the first client, a first device group to which the first client belongs, wherein the first device group is either device group in the at least two device groups, and sending a publish message to a second client in the first device group, wherein the publish message comprises the first data.

2. The method according to claim 1, wherein before the receiving a publish request sent by a first client, the method further comprises:

receiving a subscribe request sent by the second client, wherein the subscribe request carries indication information of the first topic, and the subscribe request is used to request the MQTT server to send data corresponding to the first topic to the second client.

3. The method according to claim 1, wherein before the grouping the plurality of clients based on the identity identifiers of the plurality of clients and the grouping condition, the method further comprises:

receiving identification information of each client in the plurality of clients sent by the client, wherein the identification information of the client is used to indicate the identity identifier of the client.

4. The method according to claim 1, wherein the determining a first device group to which the first client belongs comprises:

determining the first device group based on the identity identifier of the first client and the grouping condition.

5. The method according to claim 1, wherein before the grouping a plurality of clients, the method comprises:

determining that each client in the plurality of clients allows being grouped into a device group.

6. The method according to claim 5, wherein the determining that each client in the plurality of clients allows being grouped into a device group comprises:

receiving a grouping flag sent by each client in the plurality of clients, wherein each grouping flag is used to indicate whether a corresponding client allows being grouped into a device group.

7. The method according to claim 6, wherein the grouping flag is carried in a connection request message, wherein the connection request message is used to request to establish a connection with the MQTT server.

8. A communications apparatus, wherein the apparatus is applied to a message queue telemetry transport (MQTT) server comprising:

a memory and one or more processors, the one or more processors including:

a grouping unit, configured to group a plurality of clients, to obtain at least two device groups, wherein each of the at least two device groups comprises at least two clients, the grouping unit being further configured to determine a grouping condition, wherein the grouping condition is specified by a preset grouping rule and comprises a condition that identity identifiers of clients grouped into a same device group need to satisfy, and one identity identifier can uniquely indicate one client, and group the plurality of clients based on the identity identifiers of the plurality of clients and the grouping condition;

a receiving unit, configured to receive a publish request sent by a first client, wherein the publish request comprises first data, the first data corresponds to a first topic, and the publish request is used to request the MQTT server to publish the first data;

a determining unit, configured to use an identity identifier of the first client to select a first device group to which the first client belongs, wherein the first device group is either device group in the at least two device groups; and a sending unit, configured to send a publish message to a second client in the first device group, wherein the publish message comprises the first data.

9. The apparatus according to claim 8, wherein the receiving unit is further configured to receive a subscribe request sent by the second client, wherein the subscribe request carries indication information of the first topic, and the subscribe request is used to request the MQTT server to send data corresponding to the first topic to the second client.

10. The apparatus according to claim 8, wherein the receiving unit is further configured to: before grouping the plurality of clients based on the identity identifiers of the plurality of clients and the grouping condition, receive identification information of each client in the plurality of clients sent by the client, wherein the identification information of the client is used to indicate the identity identifier of the client.

11. The apparatus according to claim 8, wherein the determining unit is configured to select the first device group based on the identity identifier of the first client and the grouping condition.

12. The apparatus according to claim 8, wherein the determining unit is further configured to: before the MQTT server groups the plurality of clients, determine that each client in the plurality of clients allows being grouped into a device group.

13. The apparatus according to claim 12, wherein that the determining unit determines that each client in the plurality of clients allows being grouped into a device group comprises:

receiving, by the receiving unit, a grouping flag sent by each client in the plurality of client, wherein each grouping flag is used to indicate whether a corresponding client allows being grouped into a device group.

14. The apparatus according to claim 13, wherein the grouping flag is carried in a connection request message, wherein the connection request message is used to request to establish a connection with the MQTT server.

* * * * *